United States Patent
Abe et al.

(12) United States Patent (10) Patent No.: US 6,585,292 B2
Abe et al. (45) Date of Patent: Jul. 1, 2003

(54) AIRBAG DEVICE WITH SHAPE-MAINTAINING MEMBER

(75) Inventors: Kazuhiro Abe, Tokyo (JP); Noriyuki Kosugi, Tokyo (JP); Tadahiro Igawa, Tokyo (JP)

(73) Assignee: Takata Corporation, Tokyo (JP)

( * ) Notice: Subject to any disclaimer, the term of this patent is extended or adjusted under 35 U.S.C. 154(b) by 132 days.

(21) Appl. No.: 09/812,958

(22) Filed: Mar. 27, 2001

(65) Prior Publication Data

US 2002/0020995 A1 Feb. 21, 2002

(30) Foreign Application Priority Data

Apr. 7, 2000 (JP) .......................... 2000-106791

(51) Int. Cl.$^7$ .............................................. G60R 21/16
(52) U.S. Cl. ................... 280/743.1; 280/728.1; 280/728.2
(58) Field of Search ................ 280/728.1, 728.2, 280/743.1

(56) References Cited

U.S. PATENT DOCUMENTS

| | | | | |
|---|---|---|---|---|
| 5,498,023 A | * | 3/1996 | Adams et al. | 280/728.2 |
| 5,765,867 A | * | 6/1998 | French | 280/743.2 |
| 5,810,385 A | * | 9/1998 | Henseler et al. | 280/728.1 |
| 5,865,466 A | * | 2/1999 | Yamamoto et al. | 280/743.1 |
| 6,070,904 A | * | 6/2000 | Ozaki et al. | 280/743.1 |
| 6,206,409 B1 | * | 3/2001 | Kato et al. | 280/728.2 |

FOREIGN PATENT DOCUMENTS

| | | |
|---|---|---|
| JP | 8-268198 | 10/1996 |
| JP | 11-28997 | 2/1999 |
| JP | 11-59310 | 3/1999 |

* cited by examiner

*Primary Examiner*—Lesley D. Morris
*Assistant Examiner*—L. Lum

(57) ABSTRACT

An airbag is folded into a predetermined shape and is held by a shape-maintaining member or rubber strap to keep its shape. Both ends of the rubber strap are attached to the airbag by sewing portions. When the airbag is inflated with gas from an inflator, the rubber strap is detached, so that the airbag rapidly expands. In the airbag device with the shape-maintaining member, the shape of the folded airbag can be maintained, so that the airbag can be easily assembled.

10 Claims, 14 Drawing Sheets

AIRBAG DEVICE WITH SHAPE-MAINTAINING MEMBER

BACKGROUND OF THE INVENTION AND RELATED ART STATEMENT

The present invention relates to an airbag device for protecting an occupant of an automobile or other high-speed vehicle, and more particularly, an airbag device having a member for maintaining the shape of a folded airbag thereof.

Airbags for automobiles are normally made of fabrics of synthetic resin yarns. Such an airbag is folded into a predetermined shape and covered by a module cover and/or a lid. For assembling an airbag device, the airbag is held by hands to maintain its folded state when it is accommodated into the module cover.

As mentioned above, the airbags are normally made of woven fabrics of resin yarns. Therefore, the airbags have resiliency after folded. Such an airbag easily looses its folded state during the operation of accommodating the airbag into the module cover. It takes hours or labor for accommodating the airbag into the module cover.

The airbags may be previously folded and transported to an assembly area where the airbags are attached to casings and accommodated into module covers. Also, in this case, the airbag may loose its folded state during the transportation and/or assembly. In addition, there is also a possibility that the airbag loses its shape inside the module cover even after assembly. In this case, the airbag may apply stress to the module cover from the inside in such a direction as to rise the surface, that is, may deform the module cover.

In solving the aforementioned problems, the folded airbag may be wrapped by a paper or fabric. However, it takes some trouble to wrap the airbag with a non-elastic sheet-like member, such as paper, synthetic paper, fabric, or non-woven fabric, because a worker should apply tension to the airbag during the wrapping operation of the folded airbag. In addition, it is difficult to obtain a desired configuration because the sheet-like wrapping member is influenced by the shape of the folded airbag.

Accordingly, an object of the invention is to provide an airbag device with a shape-maintaining member for maintaining the shape of a folded airbag, thereby facilitating the assembly of the airbag device.

Another object of the invention is to provide an airbag device as stated above, wherein the shape-maintaining member can be extremely easily attached to the folded airbag.

Further objects and advantages of the invention will be apparent from the following description of the invention.

SUMMARY OF THE INVENTION

An airbag device according to the present invention comprises a folded airbag, and a shape-maintaining member for maintaining the shape of the folded airbag. The shape-maintaining member is made of an elastic material.

The shape-maintaining member is released or torn when the airbag is inflated, thereby canceling the restraint to the airbag.

The shape-maintaining member may have a belt-like shape, for example a rubber band. The ends of the belt-like shape-maintaining member are connected by a detachable connecting member to make the shape-maintaining member just like an endless belt.

The connecting member may be composed of V-like hooks. The connecting member may be composed of a pair of connecting pieces, each having a plurality of flat plates spaced apart from each other, wherein the flat plates of one of the connecting pieces are engagable with the spaces between the flat plates of the other of the connecting pieces.

The shape-maintaining member may have a sheet-like shape. In this case, the shape-maintaining member is preferably fixed by bolts for mounting the airbag.

In another embodiment, an airbag device of the present invention comprises a folded airbag, and a shape-maintaining member for maintaining the shape of the folded airbag. The shape-maintaining member is made of synthetic resin and has an opening, through which the airbag passes during the expansion of the airbag. At least one pair of side edges of the opening extends substantially parallel to the folded edges of the folded airbag. According to this airbag device, the airbag smoothly passes through the opening.

In a further embodiment, an airbag device of the present invention comprises a folded airbag, and a shape-maintaining member for maintaining the shape of the folded airbag. The shape-maintaining member is made of synthetic resin and has an opening, through which the airbag passes during the expansion of the airbag. The shape-maintaining member is deformable when it is pressed by the airbag being inflated so as to enlarge the opening.

According to this airbag device, the airbag passes through the opening during the expansion of the airbag. During this, the shape-maintaining member is deformed to spread outward, thereby canceling the restraint to the airbag by the shape-maintaining member.

The shape-maintaining member may have apertures or cut-outs for facilitating the aforementioned deformation.

DETAILED DESCRIPTION OF PREFERRED EMBODIMENTS

Figure 1:
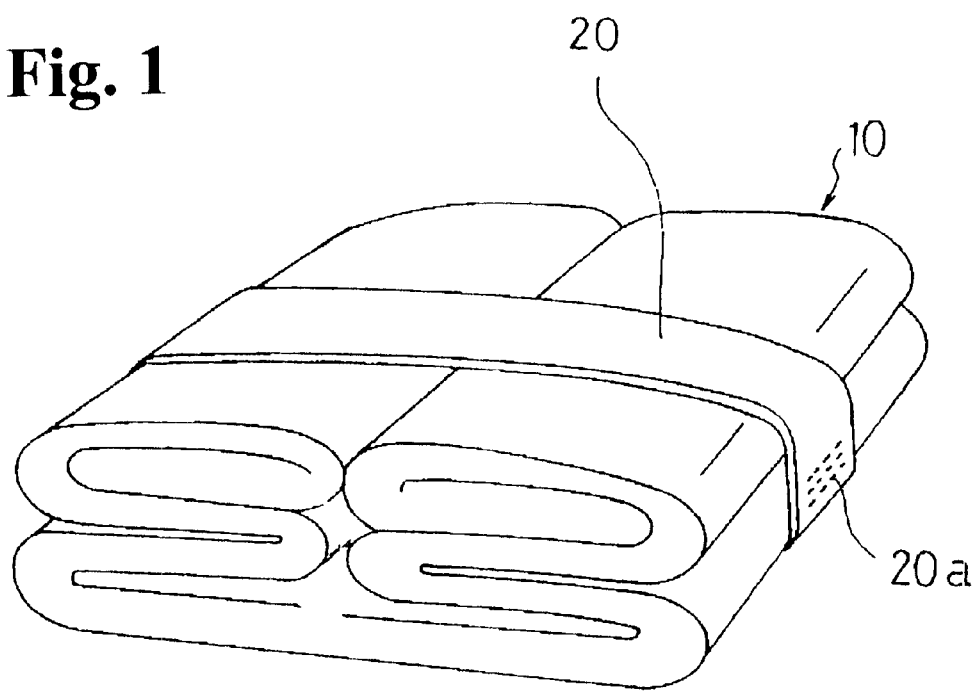
FIG. 1 is a perspective view showing a folded airbag of an airbag device according to an embodiment, taken from above.
Figure 2:
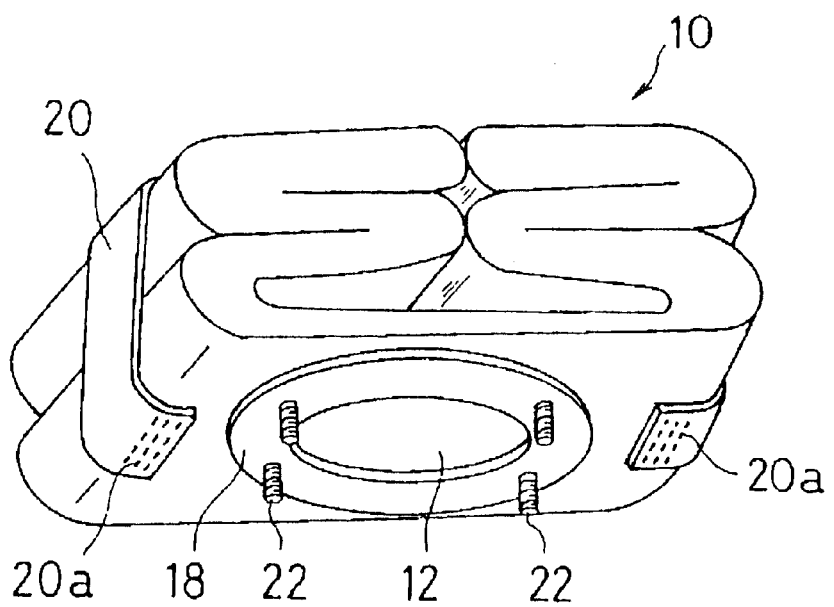
FIG. 2 is a perspective view showing the folded airbag shown in FIG. 1, taken from below.
Figure 3:
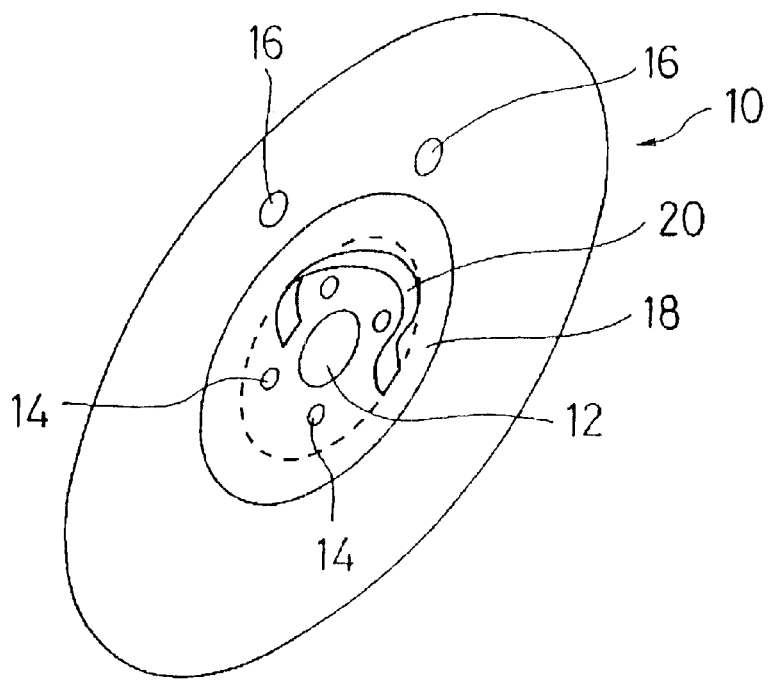
FIG. 3 is a perspective view showing the back of the airbag, shown in FIGS. 1 and 2, in a spread state.

Hereinafter, embodiments of the present invention will be described with reference to attached drawings. FIG. 1 is a perspective view, taken from above, of a folded airbag of an airbag device according to an embodiment, and FIG. 2 is a perspective view, taken from below, of the folded airbag. FIG. 3 is a perspective view of the airbag in the spread state.

An airbag 10 is a driver-side airbag comprising a circular rear panel and a circular front panel which are superposed on each other and sawn together around their peripheries to form the airbag 10 in a bag shape. The rear panel has, at its center, an opening 12 for the insertion of an inflator, and has, around the opening 12, holes 14 for the insertion of bolts for mounting the airbag to a retainer. The rear panel also has vent holes 16 for permitting gas within the airbag to be discharged. A reinforcing cloth 18 is attached to a portion around the opening 12 by sewing.

In this embodiment, a rubber strap 20 is provided as a shape-maintaining member for maintaining the shape of the folded airbag 10. Both ends of the rubber strap 20 are fixed to areas near the opening 12 by sewing.

After folding the airbag 10, the rubber strap 20 is placed on the folded airbag 10 to extend from both sides to the top of the folded airbag 10 as shown in FIG. 1 and FIG. 2, thereby maintaining the shape of the folded airbag 10.

The airbag 10 is attached to the retainer and is covered by a module cover. The inflator attached to the retainer is inserted into the airbag 10 through the opening 12.

As the inflator ejects gas, the airbag 10 is inflated. During this, the rubber strap 20 is detached from the airbag so as to cancel the restraint on the airbag 10 by the rubber strap 20, whereby the airbag 10 opens the module cover and largely expands into a vehicle cabin.

Figure 4:
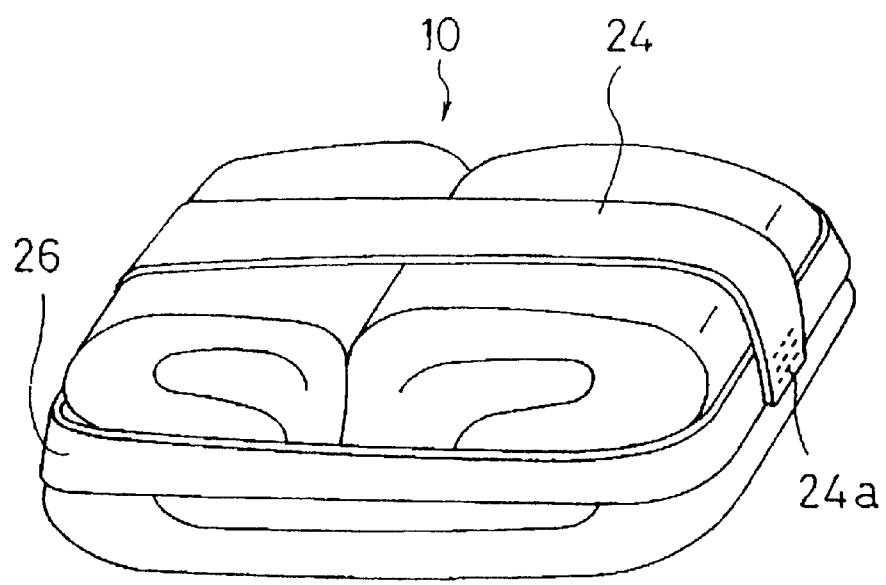
FIG. 4 is a perspective view showing a folded airbag of the airbag device according to another embodiment.

Though the shape of the folded airbag 10 is maintained by only one rubber strap 20 in the embodiment shown in FIG. 1 through FIG. 3, the shape of the folded airbag 10 may be maintained by two rubber straps 24, 26 as shown in FIG. 4. In FIG. 4, the rubber strap 24 extends from both sides to the top of the folded airbag 10 just like to wind the folded airbag 10. On the other hand, the rubber strap 26 is disposed to extend all around the side periphery of the folded airbag 10. These rubber straps 24, 26 are sewn to the airbag 10 at sewn portions 24a.

Figure 5:
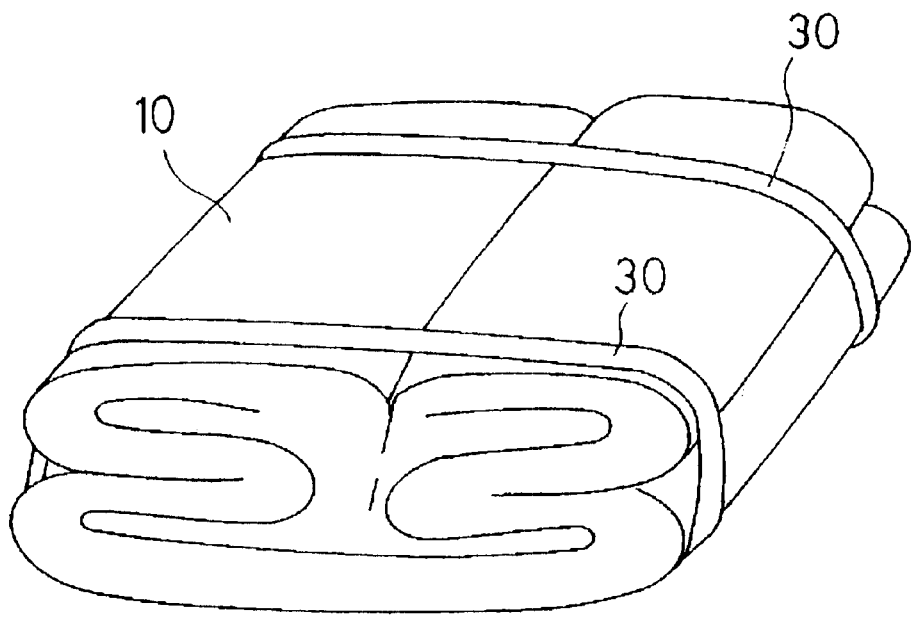
FIG. 5 is a perspective view showing a folded airbag of the airbag device according to a different embodiment.

Though the rubber strap is employed as the shape-maintaining member in the embodiments shown in FIG. 1 through FIG. 4, ring-like rubber bands 30 may be employed as the shape-maintaining member as shown in FIG. 5. FIG. 5 is a perspective view, taken from above, of the folded airbag 10, and FIG. 6 is a perspective view, taken from the bottom, of the folded airbag 10.

Figure 6:
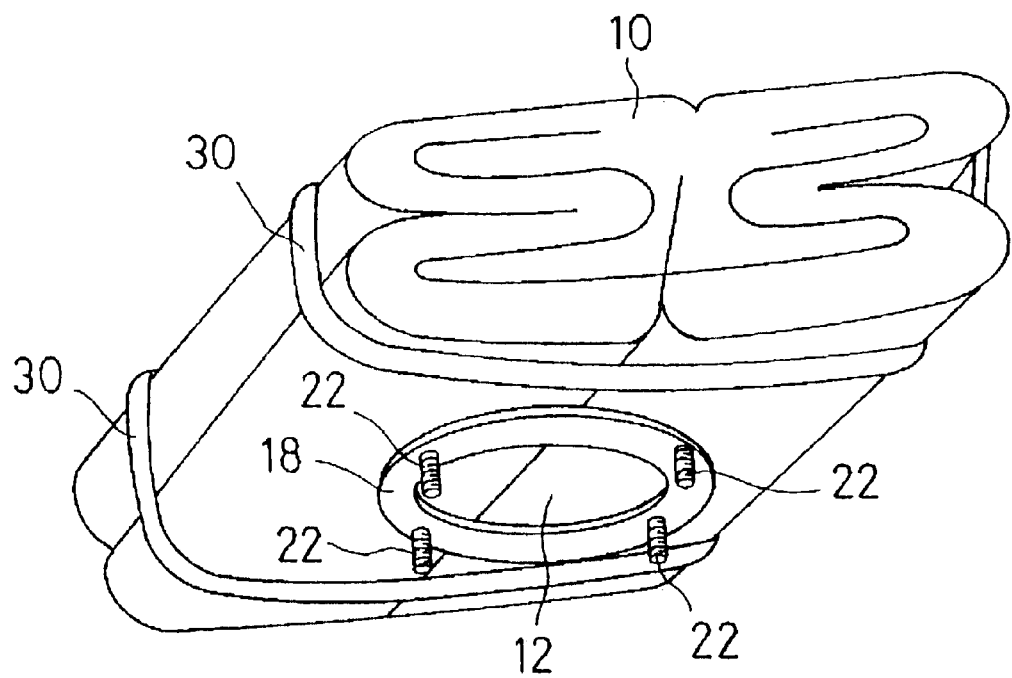
FIG. 6 is a perspective view showing a folded airbag of the airbag device showing in FIG. 5.

As shown in FIG. 5 and FIG. 6, the rubber bands 30 are disposed around side portions of the folded airbag 10 just like to wind around the folded airbag.

Figure 7:
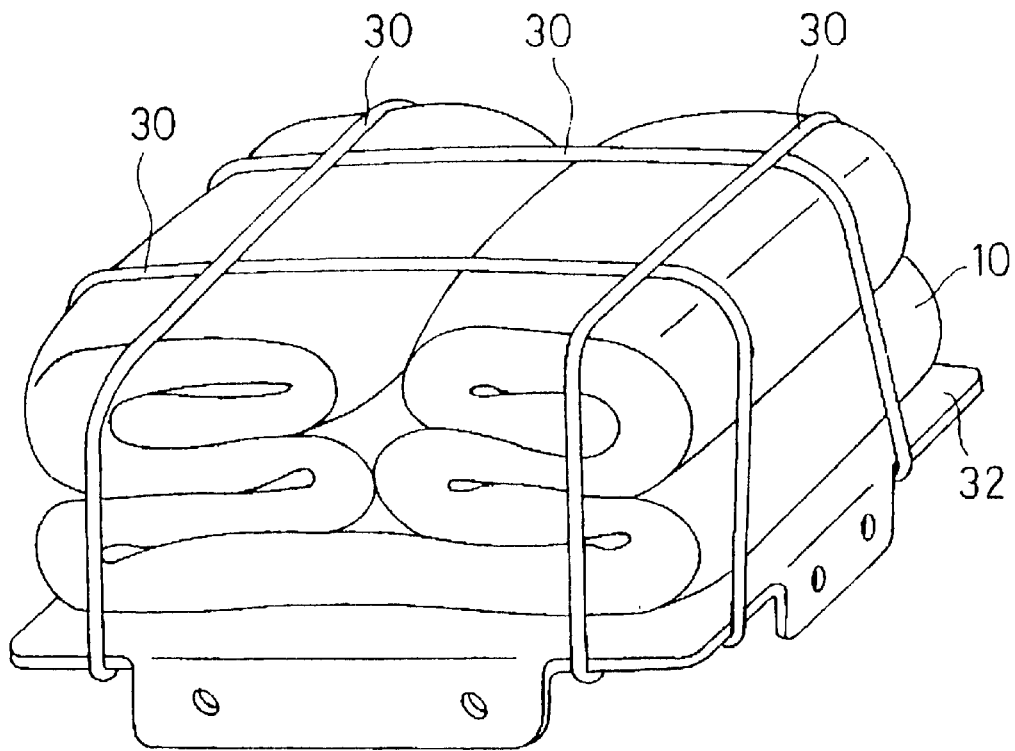
FIG. 7 is a perspective view showing a folded airbag of the airbag device according to a different embodiment.

According to the present invention, the four ring-like rubber bands 30 may be used to be disposed around the respective side portions of the folded airbag 10, respectively, as shown in FIG. 7. As also shown in FIG. 7, the rubber bands 30 may be disposed to bind a retainer and the airbag 10 together after the airbag 10 is attached to the retainer 32 and then folded.

Figure 8:
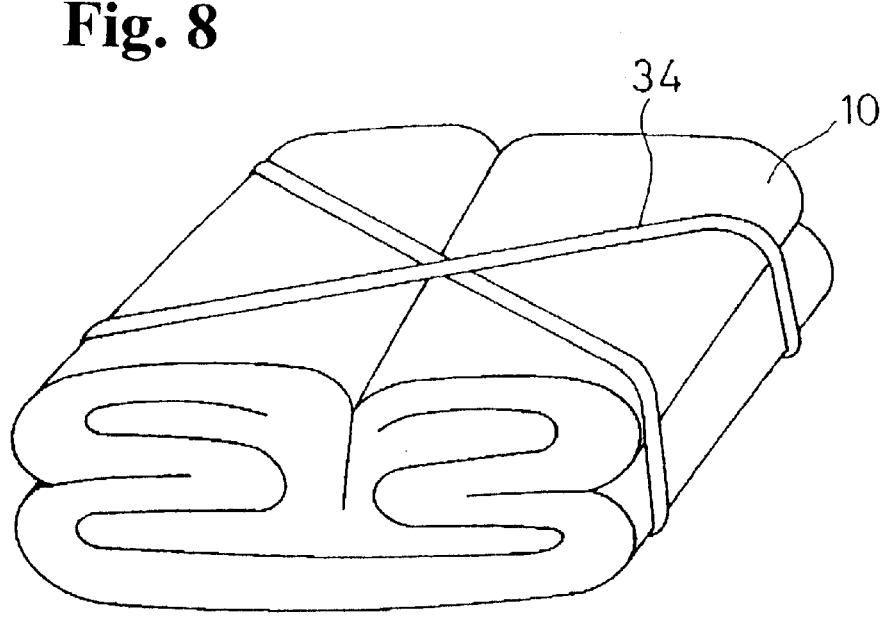
FIG. 8 is a perspective view showing a folded airbag of the airbag device according to a different embodiment.
Figure 9:
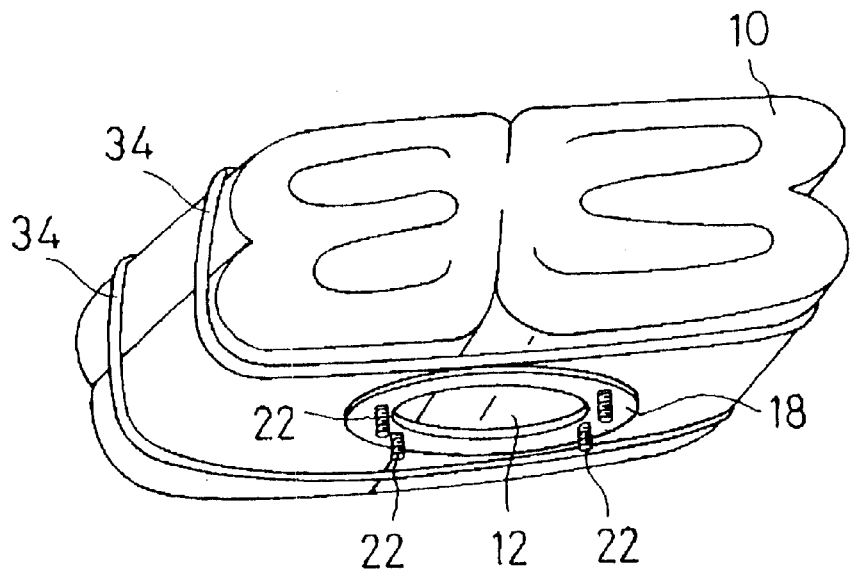
FIG. 9 is a perspective view showing a folded airbag of the airbag device according to a different embodiment.
Figure 10:
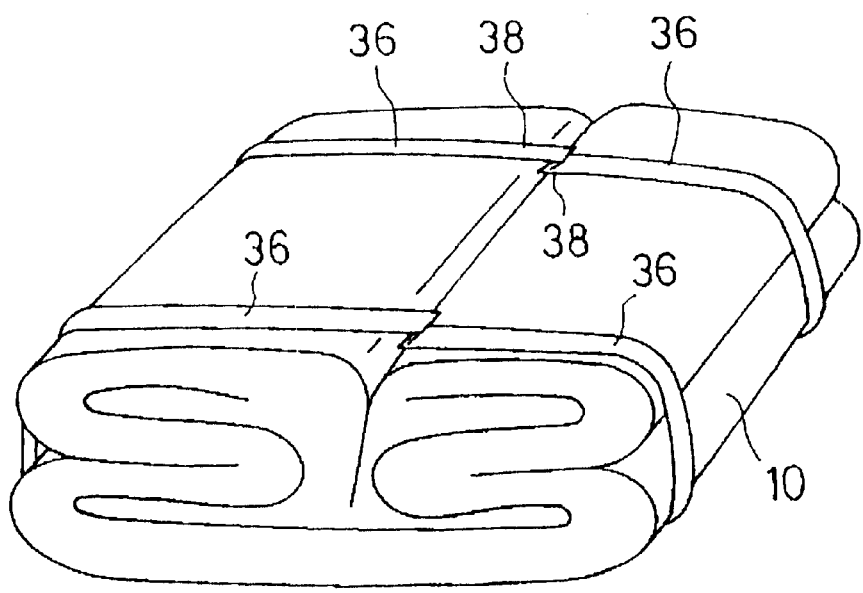
FIG. 10 is a perspective view showing a folded airbag of the airbag device according to a different embodiment.

According to the present invention, only one ring-like rubber band may be used for maintaining the shape of the folded airbag 10. Such embodiment is shown in FIGS. 8 and 9, wherein one long ring-like rubber band 34 is disposed to cross the top of the folded airbag 10 and to extend the bottom of the folded airbag 10 along both sides thereof as shown in FIG. 9.

When the airbag 10 maintained in its folded shape by the rubber bands 30, 34 is inflated, the restraint on the airbag 10 by the rubber bands 30, 34 is cancelled, whereby the airbag 10 expands largely into the vehicle cabin.

Figure 11:
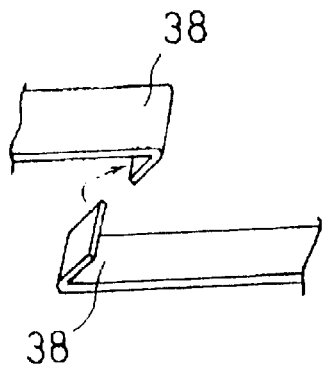
FIG. 11 is an enlarged perspective view showing a structure of connecting ends of a belt shown in FIG. 10.

According to the present invention, belts 36 which are made of rubber or synthetic resin to have elasticity and have hooks 38 may be employed. Each belt 36 can be formed just like an endless belt having a predetermined length by connecting the hooks 38 to each other. The shape of the folded airbag 10 is maintained by the endless belts 36. The hooks 38 are formed in a V-like shape and are disposed at the ends of each belt 36 as shown in FIG. 11. When the airbag 10 is inflated, the connection between the hooks 38 is released, whereby the restraint on the airbag 10 by the belts 36 is cancelled, and the airbag 10 thus expands largely into the vehicle cabin.

Figure 12A:
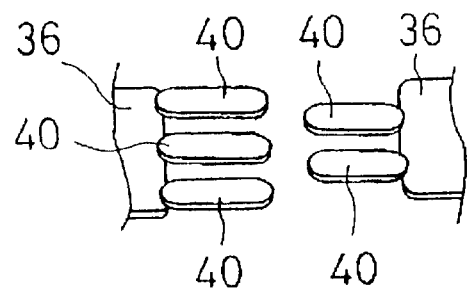
FIGS. 12(*a*) and 12(*b*) are perspective views showing different configurations of the connecting ends of the belt.
Figure 12B:
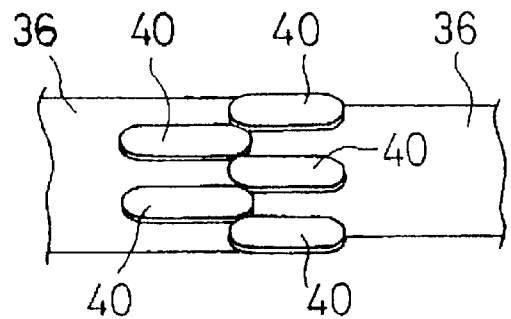

The member for connecting the belt 36 may be composed of flat plates (flat oval in shape in FIGS. 12(a) and 12(b)) which are arranged to have small spaces therebetween as shown in FIGS. 12(a) and 12(b). In this embodiment, three plates 40 are disposed on one end of the belt 36, and two plates 40 are disposed on the other end of the belt 36. As shown in FIG. 12(b), the plates 40 on the right end of the belt 36 are put on the left of the plates 40 of the left end of the belt 36, so that the plates 40 are engaged to each other, thereby connecting the belt 36.

Hereinafter, different embodiments of the present invention will be described with reference to FIG. 13 through FIG. 21. In these embodiments, casings are used as a shape-maintaining member.

Figure 13:
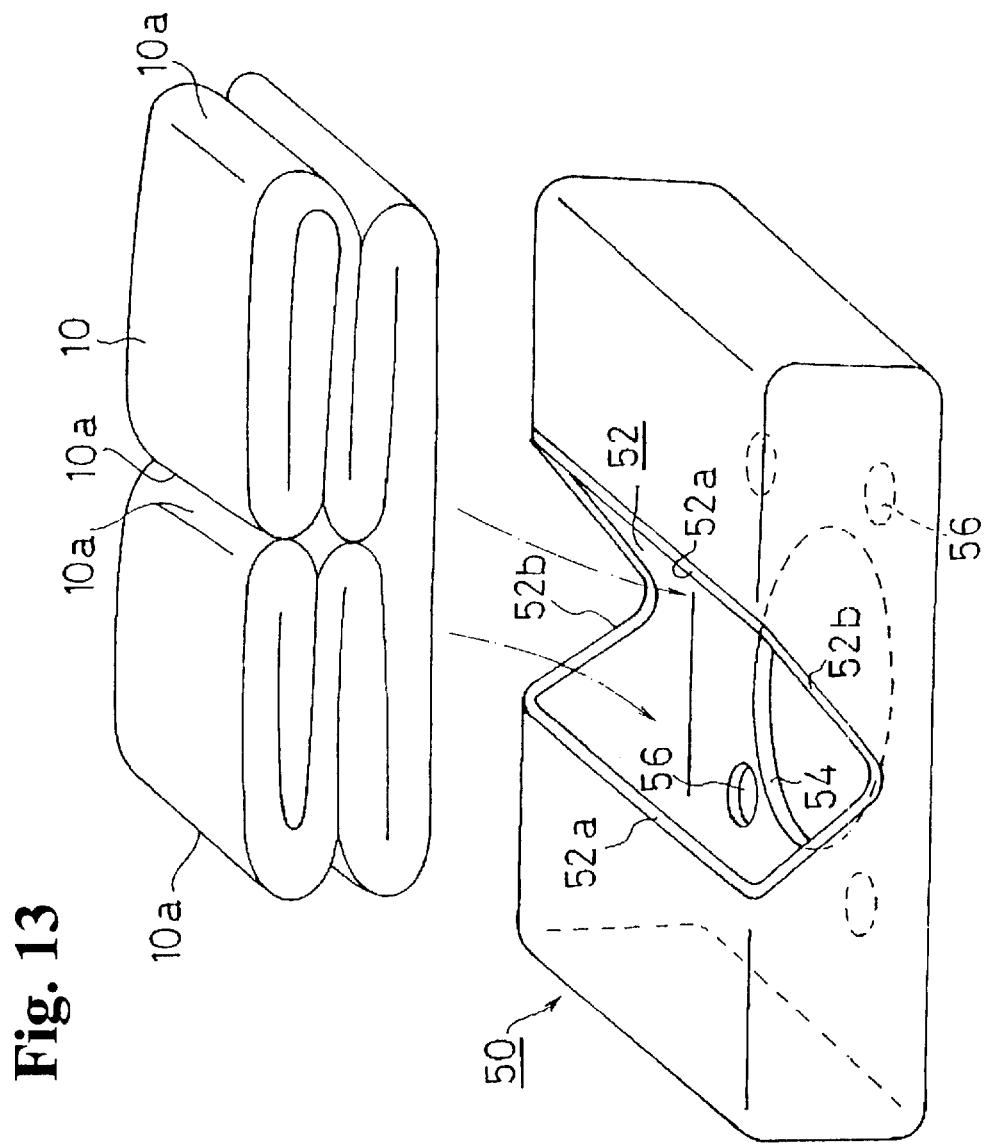
FIG. 13 is a perspective view showing a casing as the shape-maintaining member.

In an embodiment of FIG. 13, a casing 50 has an opening 52 formed at the top thereof, through which the airbag 10 passes, an opening 54 for insertion of an inflator, and holes 56 for insertion of airbag-fixing bolts, which are formed at the bottom thereof. The opening 52 is rectangular in the top plan view, and includes a pair of side edges 52a substantially parallel to each other. The side edges 52a are substantially parallel to folded edges 10a of the folded airbag 10. The folded airbag 10 is inserted into the casing 50, and airbag-fixing bolts 22 (not shown in FIG. 13) are inserted through the holes 56 to fix the airbag to the retainer.

When the airbag 10 is inflated by the inflator, the airbag 10 passes through the opening 52 and largely expands into the vehicle cabin. During the expansion of the airbag 10, the casing 50 is deformed to spread to the right and the left in FIG. 13.

Figure 14:
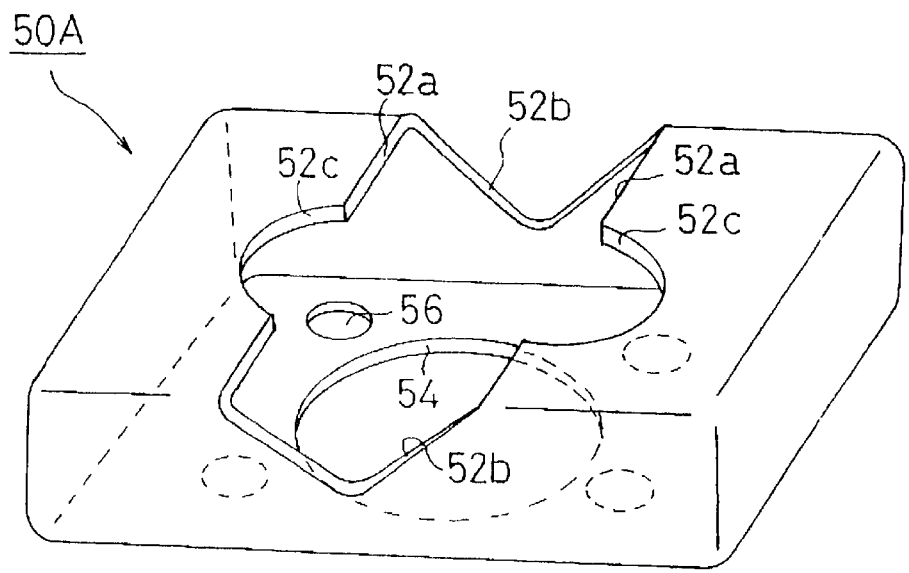
FIG. 14 is a perspective view showing a different casing as the shape-maintaining member.

Though the side edges 52a of the opening 52 are straight in FIG. 13, the side edges 52a may include semi-circular cut-outs 52c substantially at the centers thereof in the longitudinal direction, as shown in a casing 50A of FIG. 14.

Figure 15:
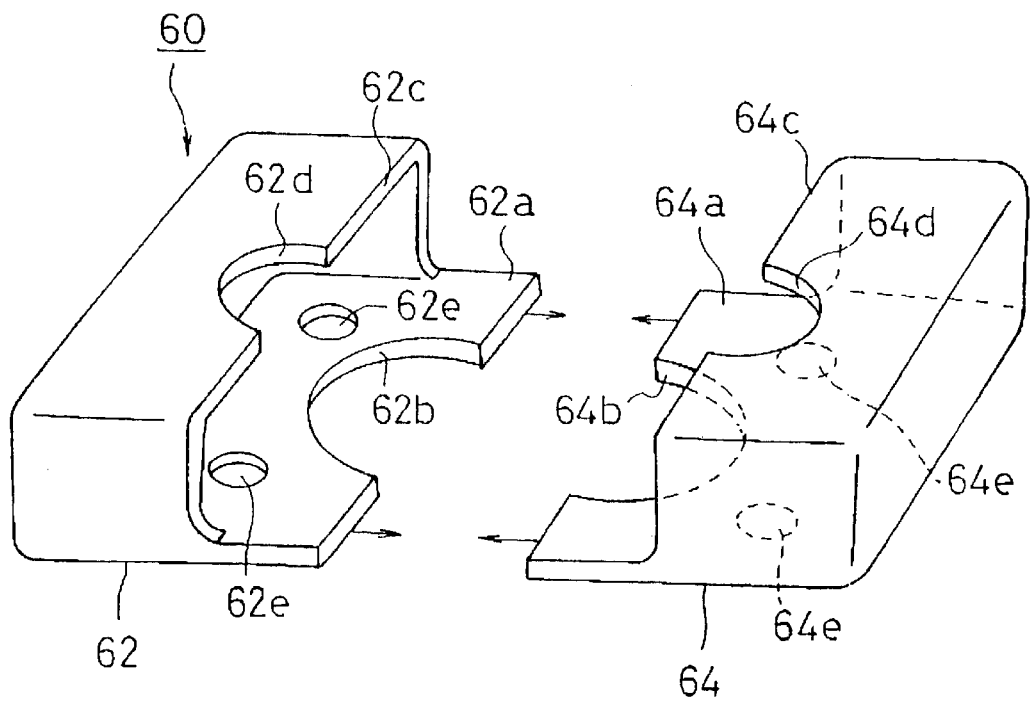
FIG. 15 is a perspective view showing a different casing as the shape-maintaining member.

As shown in FIG. 15, a casing 60 may be employed which is a combination of right and left halves 62, 64. The casing 60 is composed of the halves 62, 64 which are combined such that the respective bottoms 62a, 64a abut against each other. Semi-circular cut-outs 62b, 64b are formed at the center of the butted sides. An opening for insertion of an inflator is composed of the semicircular cut-outs 62b, 64b where the bottoms 62a, 64a are butted against each other. Formed in the bottoms 62a, 64a are holes 62e, 64e for insertion of airbag-fixing bolts.

The tops of the halves 62, 64 are provided with a pair of side edges 62c, 64c parallel to each other. The side edges 62c, 64c are positioned above the butted sides of the bottoms 62a, 64a so as to form an opening between the side edges 62c and 64c for the passage of the airbag where the halves 62, 64 are butted against each other. It should be noted that, in FIG. 15, the semi-circular cut-outs 62d, 64d are formed at the centers in the longitudinal direction of the side edges 62c, 64c.

Figure 16:
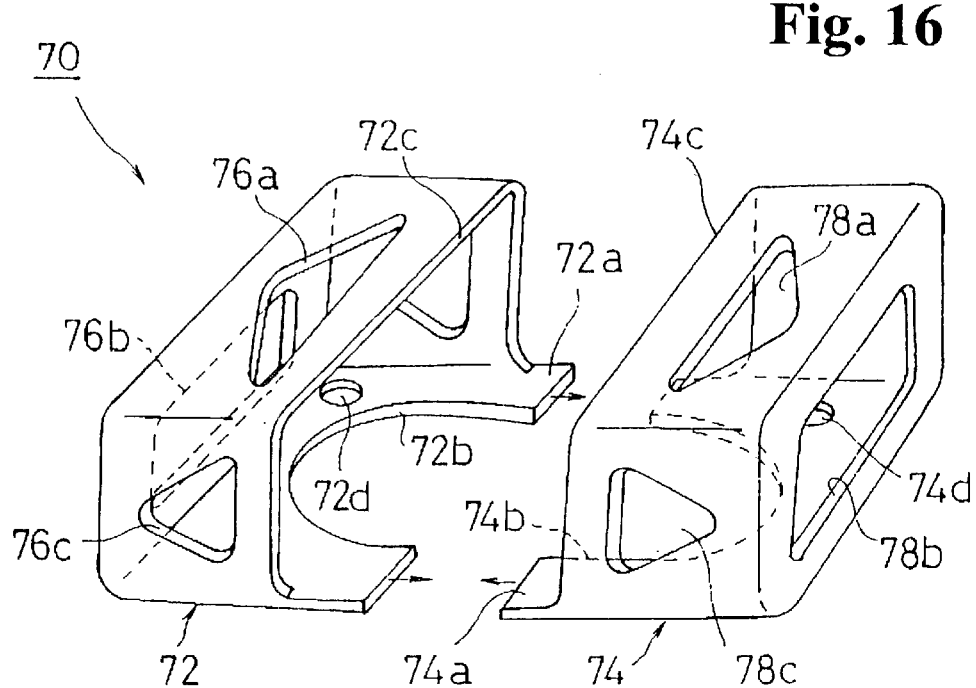
FIG. 16 is a perspective view showing a different casing as the shape-maintaining member.

According to the present invention, as shown in FIG. 16, a casing 70 may be employed which is a combination of right and left halves 72, 74 which are provided with window-like apertures 76a, 76b, 76c, 78a, 78b, 78c.

The halves 72, 74 comprise, just like the halves 62, 64 of the aforementioned casing 60, bottoms 72a, 74a which are butted against each other, semi-circular cut-outs 72b, 74b which are formed in the bottoms 72a, 74a for cooperating together to form an opening of the insertion of an inflator, holes 72d, 74d which are formed in the bottoms 72a, 74a for the insertion of airbag-fixing bolts, and side edges 72c, 74c provided on the tops of the halves 72, 74. The side edges 72c, 74c are positioned above the butted sides of the bottoms 72a, 74a so as to form an opening for the passage of the airbag where the halves 72, 74 are butted against each other.

Figure 17:
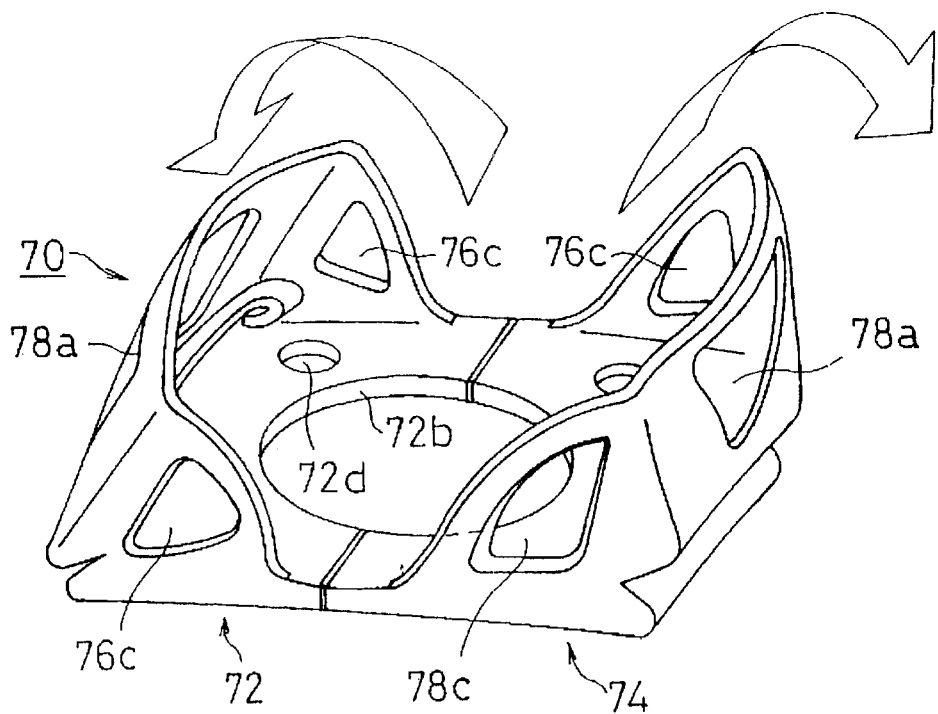
FIG. 17 is a perspective view showing the casing in FIG. 16 in a deformed condition.

When the airbag is inflated, the center portions of the casing 70 easily stretch, and the outer portions of the casing 70 are collapsed, whereby the casing 70 is deformed as shown in FIG. 17. To facilitate this deformation, the aforementioned apertures 76a, 76b, 76c, 78a, 78b, 78c are provided.

The apertures 76a, 78a in the tops are triangular and are arranged such that the tops of the triangles are positioned far from the side edges 72c, 74c. The apertures 76b, 78b are rectangular and are formed in opposite sides having the farthest distance of the halves 72, 74. The apertures 76c, 78c are formed in opposite sides extending in the batting direction of the halves 72, 74. These apertures 76c, 78c are triangular and are arranged such that the tops of the triangles are positioned far from the butted sides of the halves 72, 74.

Figure 18:
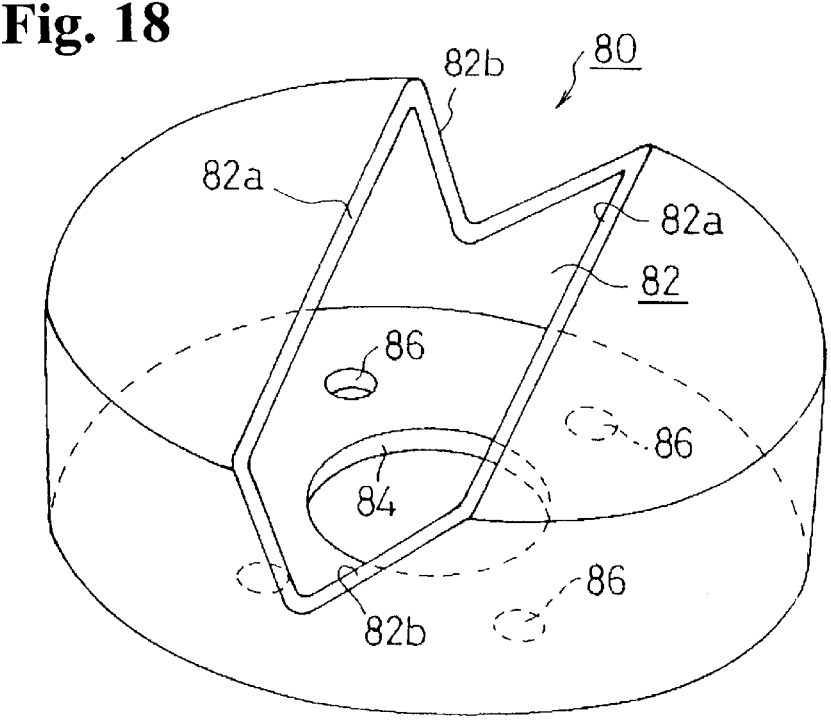
FIG. 18 is a perspective view showing a different casing as the shape-maintaining member.
Figure 19:
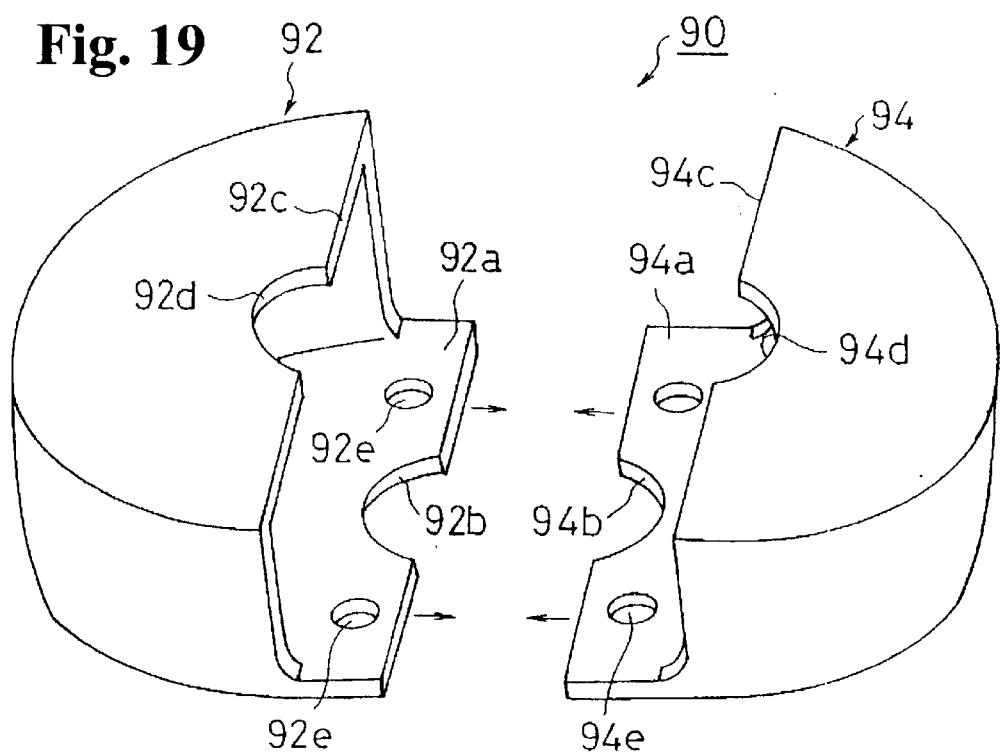
FIG. 19 is a perspective view showing a different casing as the shape-maintaining member.
Figure 20:
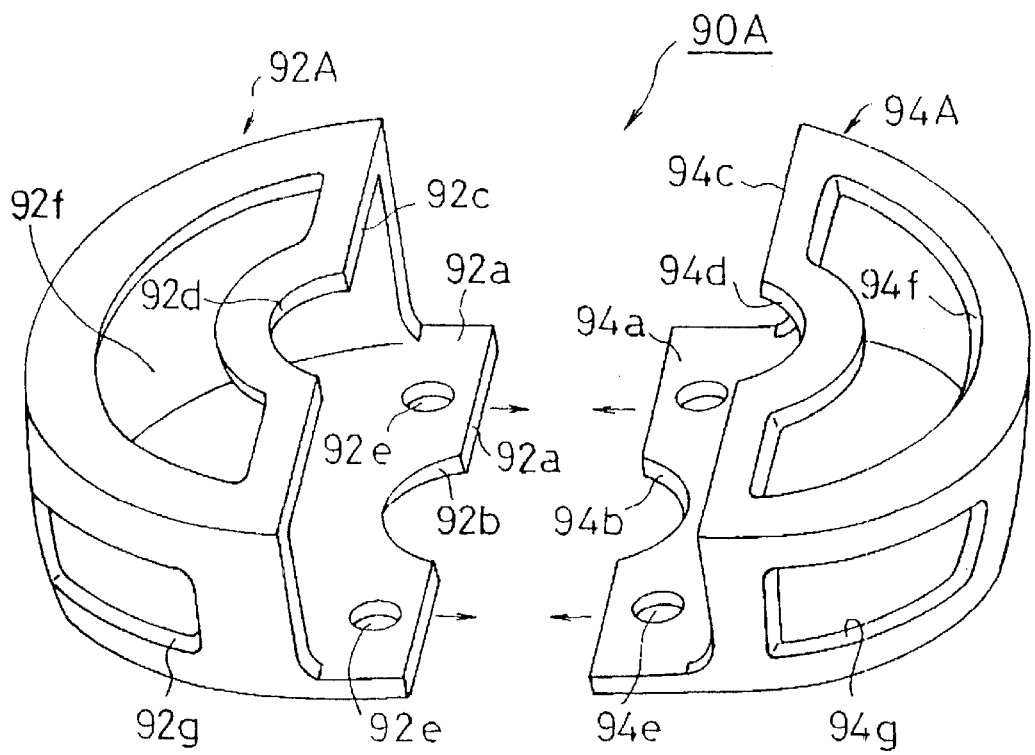
FIG. 20 is a perspective view showing a different casing as the shape-maintaining member.

Though the casing is quadrate in the top plan view in any of the embodiments shown in FIG. 13 through FIG. 17, the casing may be circular in the top plan view as shown in FIG. 18 through FIG. 20.

A casing 80 shown in FIG. 18 has an opening 82 in the top thereof through which the airbag being inflated passes, an opening 84 in the bottom thereof for the insertion of an inflator, and holes 86 in the bottom thereof for the insertion of airbag-fixing bolts. A pair of side edges 82a of the opening 82 extends parallel to the folded edges 10a of the folded airbag 10 (not shown in FIG. 18). The casing 80 has V-like side edges 82b formed in the peripheral sides.

A casing 90 shown in FIG. 19 is a combination of right and left halves 92, 94. Formed in the bottoms 92a, 94a of the halves 92, 94 are semi-circular cut-outs 92b, 94b which cooperate together to form a circular opening for insertion of an inflator where the bottoms 92a, 94a are butted against each other. Also, formed in the bottoms 92a, 94a are holes 92e, 94e for insertion of airbag-fixing bolts.

The tops of the halves 92, 94 are provided with a pair of side edges 92c, 94c which cooperate together to form an opening through which the airbag being inflated passes. The side edges 92c, 94c are positioned above the butted sides of the bottoms 92a, 94a. Formed at the centers in the longitudinal direction of the side edges 92c, 94c are semi-circular cut-outs 92d, 94d.

A casing 90A shown in FIG. 20 is similar to the casing 90 shown in FIG. 19, but halves 92A, 94A are provided with apertures 92f, 94f, 92g, 94g, respectively, for facilitating the deformation of the halves 92A, 94A. The apertures 92f, 94f are arched and formed in the tops of the halves 92A, 94A. The apertures 92g, 94g are formed in peripheral sides of the halves 92A, 94A.

Figure 21:
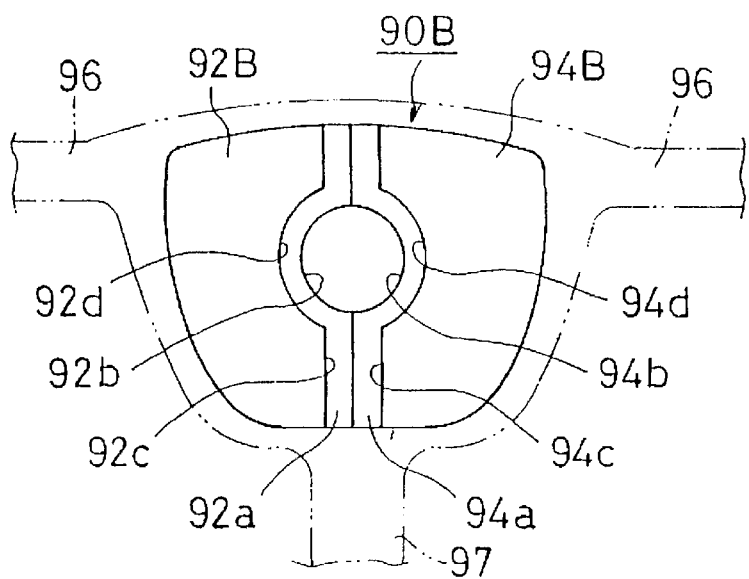
FIG. 21 is a plan view showing a different shape-maintaining member of an airbag device according to an embodiment.

According to the present invention, the casing may be of any shape besides quadrate and circular, just like a casing 90B shown in FIG. 21. The casing 90B shown in FIG. 21 is composed of a pair of halves 92B, 94B which abuts against each other. The halves 92B, 94B of the casing 90B are substantially identical in construction and function to the halves of the casing 90A, but the outer profiles of the halves 92B, 94B are of rounded trapezoidal shape. Therefore, similar or corresponding parts are identified with the same reference numeral as the casing 90A so as to omit the description of the parts.

The casing 90B composed of the halves 92B, 94B has an outer profile corresponding to the shape of the central portion of a steering wheel. Reference numeral 96 designates spokes extending laterally outwardly of the steering wheel, and reference numeral 97 designates a spoke extending in a direction from the center of the steering wheel toward an occupant sitting in a driver's seat.

Figure 22:
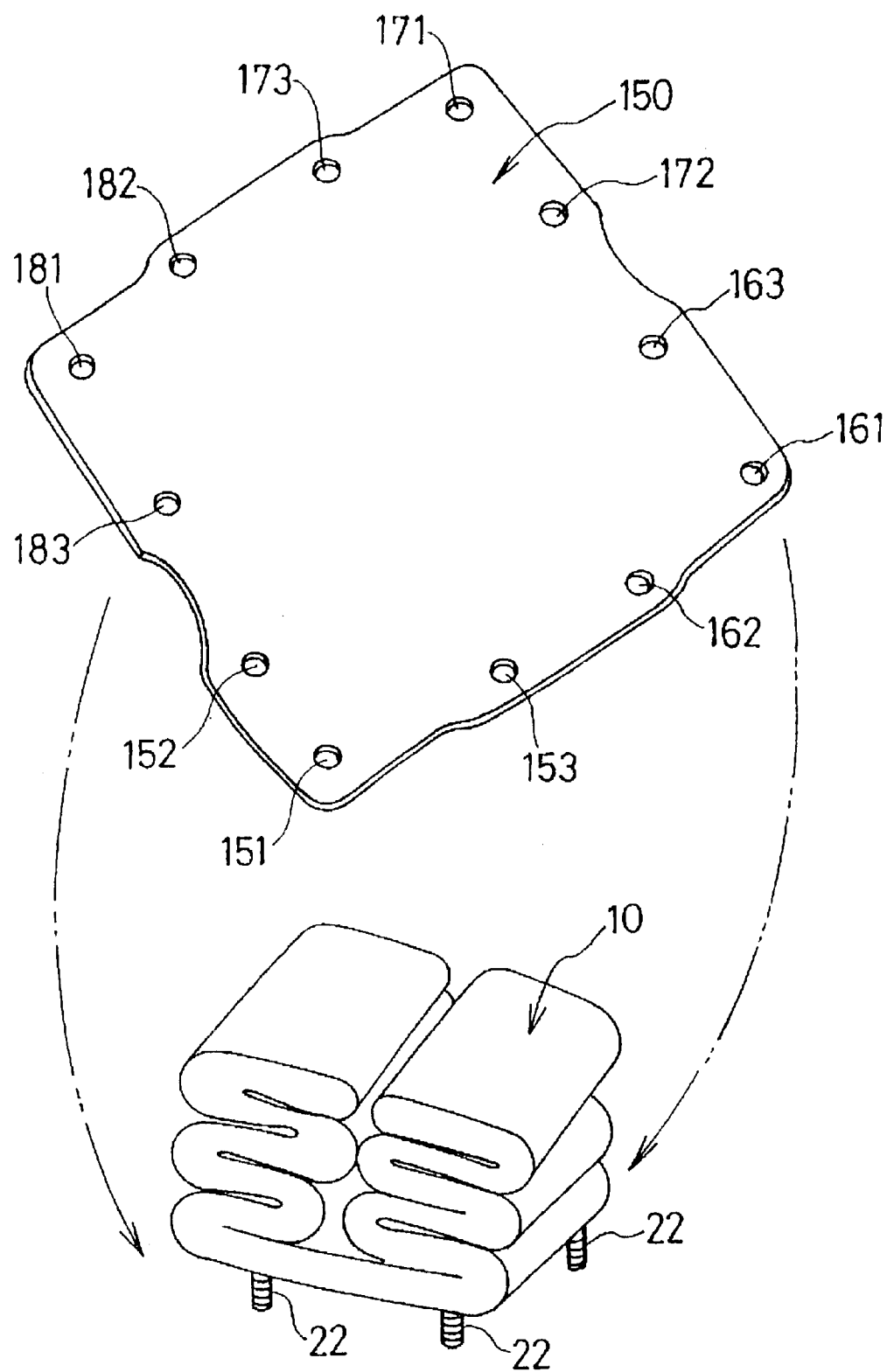
FIG. 22 is an exploded perspective view showing an airbag and a shape-maintaining member according to a different embodiment.
Figure 23:
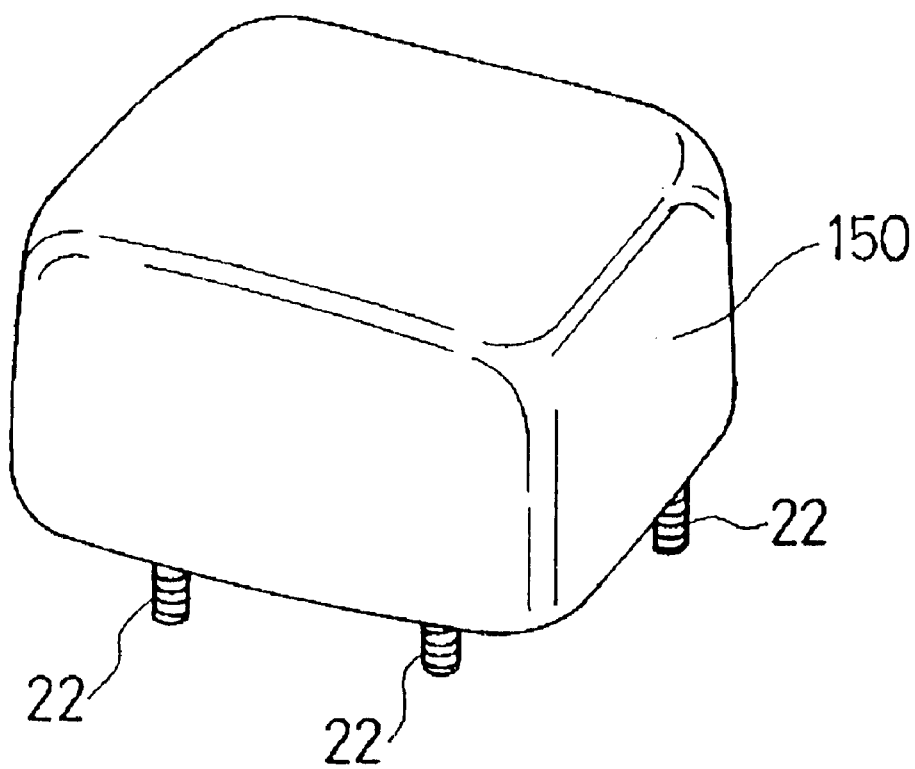
FIG. 23 is a perspective view showing the airbag covered with the shape-maintaining member of FIG. 22.

FIGS. 22 and 23 are an exploded perspective view and a perspective view showing an embodiment in which a shape-maintaining member 150 made of sheet-like rubber (for example, urethane film) (hereinafter, this shape-maintaining member will be referred to as "rubber sheet") is employed to wrap the folded airbag 10.

The rubber sheet 150 is substantially square and has holes 151, 161, 171, 181 formed at the corners thereof, respectively. The rubber sheet 150 also has holes 152, 153, 162, 163, 172, 173, 182, 183 formed on the two sides of the holes 151, 161, 171, 181, respectively.

After the rubber sheet is placed on the folded airbag 10, the holes 151, 152, 153 are coaxially superposed on each other and hooked on a first bolt 22. Further, the holes 161, 162, 163 are coaxially superposed on each other and hooked on a second bolt 22 adjacent the first bolt 22. Furthermore, the holes 171, 172, 173 are coaxially superposed on each other and hooked on a third bolt 22 (not shown) positioned diagonally from the first bolt 22, and the holes 181, 182, 183 are coaxially superposed on each other and hooked on a fourth bolt 22. In this manner, the folded airbag 10 is wrapped by the rubber sheet 150 as shown in FIG. 23.

When the airbag 10 is inflated, peripheries of the holes of the rubber sheet 150 are torn or broken. The rubber sheet 150 may be provided with a tear line or slit, so that the rubber sheet 150 may be torn or broken along the tear line or slit.

An airbag device in which a folded airbag is held by a shape-maintaining member to maintain its shape as described according to this invention is suitably used in a case where a module cover is movable in the vertical direction and a horn switch is turned ON by moving the module cover.

Figure 24:
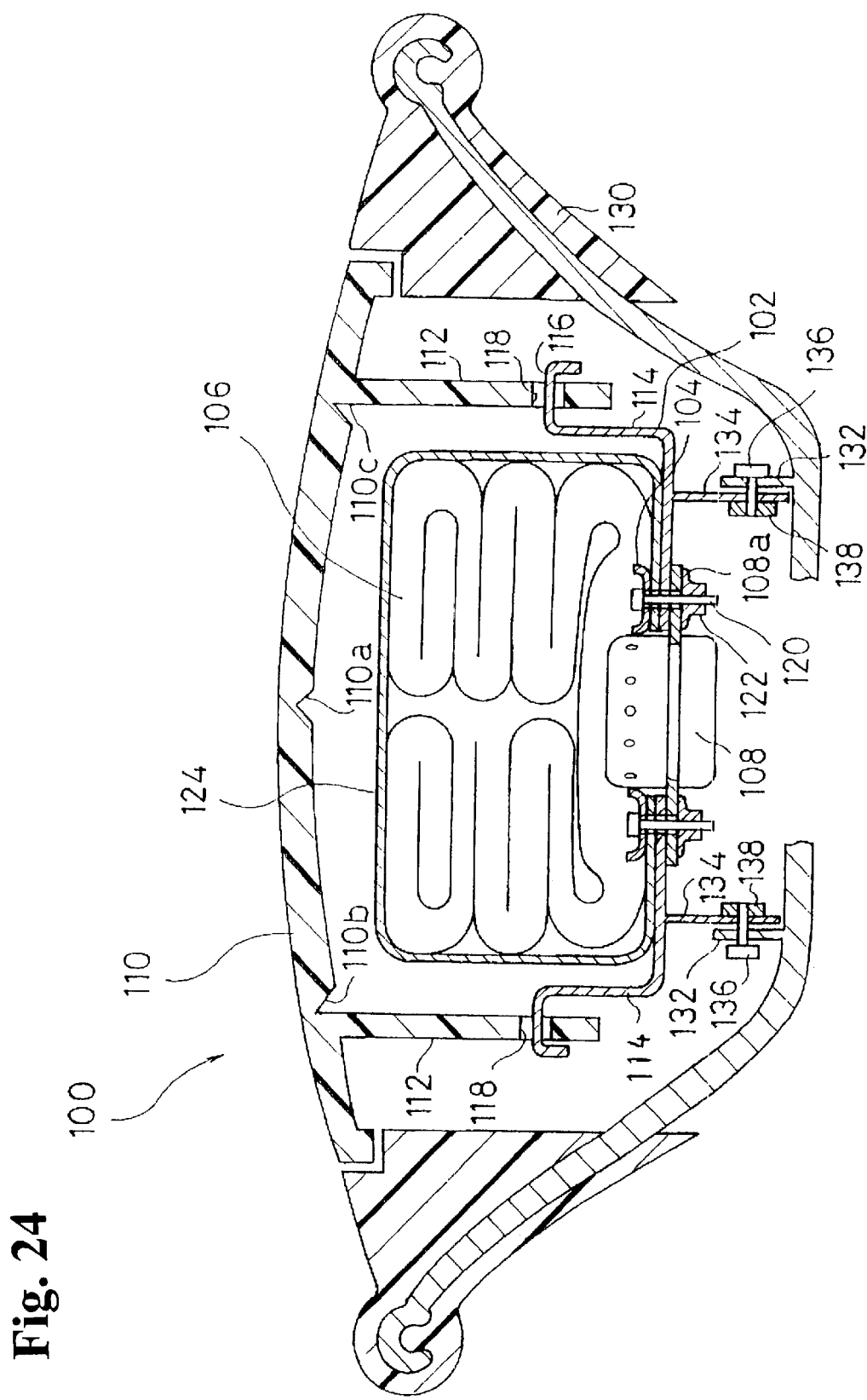
FIG. 24 is a vertical sectional view of a steering wheel provided with the airbag device according to the embodiment.

FIG. 24 is a vertical sectional view of a steering wheel 130 including an airbag device 100 having such a structure. The airbag device 100 comprises a retainer 102, an airbag 106 fixed to the retainer 102 with an airbag-fixing ring 104, an inflator 108 for inflating the airbag 106, and a module cover 110 covering the folded airbag 106.

The module cover 110 is provided with legs 112 integrally formed on the back thereof. The legs 112 have openings through which hooks 116 of side walls 114 of the retainer 102 are inserted. The side walls 114 are formed by bending forward portions of the retainer 102. The hook 116 is formed in an L-like shape extending outwardly from the side wall 114.

The inflator 108 has a flange 108*a* which is fixed to the retainer 102 together with the airbag 106 by inserting bolts 120 projecting from the ring 104 through the retainer and the flange 108*a* and then screwing nuts onto the bolts 120. The folded airbag 106 is held by a shape-maintaining member 124 to maintain its shape. The shape-maintaining member 124 may be any one of the aforementioned embodiments or one having another configuration.

The steering wheel 130 has brackets 132 projecting upwardly in FIG. 24, while the retainer 102 has projecting plates 134 projecting downwardly from the bottom thereof. The projecting plates 134 are fixed to the brackets 132 by bolts and nuts 138.

There are predetermined spaces between the openings 118 in the legs 112 of the module cover 110 and the hooks 116, so that the module cover 110 is movable in the vertical direction in FIG. 24. By depressing the module cover 110, a horn switch (not shown) is pressed and turned ON.

As apparent from the above description, the airbag device of the present invention has the shape-maintaining member for maintaining the shape of the folded airbag, thereby facilitating the assembly of the airbag device. In particular, the shape-maintaining member can be extremely easily attached to the folded airbag.

According to the present invention, the shape-maintaining member may be structured to be deformed when it is pressed by the inflating airbag during the expansion of the airbag. Therefore, the deployment of the airbag can be extremely smooth.

The airbag device of the present invention is quite suitably applied to a steering wheel of a type that a horn switch is turned ON by moving a module cover alone in the vertical direction.

While the invention has been explained with reference to the specific embodiments of the invention, the explanation is illustrative and the invention is limited only by the appended claims.

What is claimed is:

1. An airbag device comprising:

a folded airbag; and a shape-maintaining member for maintaining a shape of the folded airbag, said shape-maintaining member being made of an elastic material and having a belt shape with ends, and hooks at the ends as detachable connecting members.

2. An airbag device according to claim 1, wherein the shape-maintaining member is a rubber band.

3. An airbag device comprising:

a folded airbag; and a shape-maintaining member for maintaining a shape of the folded airbag, said shape-maintaining member being made of an elastic material and having a belt shape with ends, and detachable connecting members at the ends, said connecting members being a pair of connecting pieces each having a plurality of flat plates spaced apart from each other, the flat plates of one of said connecting pieces being engagable with spaces between the flat plates of the other of said connecting pieces.

4. An airbag device comprising:

a folded airbag; and a shape-maintaining member for maintaining a shape of the folded airbag, said shape-maintaining member being made of a synthetic resin and having a form of a casing with a center opening for substantially entirely covering the folded airbag, said airbag passing through the opening during an expansion of the airbag.

5. An airbag device according to claim 4, wherein said opening has at least one pair of side edges extending substantially parallel to folded edges of the folded airbag.

6. An airbag device according to claim 4, wherein said shape-maintaining member is deformable when it is pressed by the airbag being inflated so as to enlarge the opening.

7. An airbag device according to claim 6, wherein the shape-maintaining member has at least one of apertures and cut-outs for facilitating the aforementioned deformation.

8. An airbag device according to claim 4, wherein said shape-maintaining member has an upper portion, a bottom portion, and a side portion between the upper and bottom portions for surrounding the folded airbag.

9. An airbag device according to claim 8, wherein said center opening is formed in the upper portion, and said bottom portion has an opening for receiving an inflator.

10. An airbag device according to claim 8, wherein said shape maintaining member in the form of the casing is formed of two halves, each having the upper, bottom and side portions.

* * * * *